United States Patent
Bostick et al.

(10) Patent No.: US 9,767,853 B2
(45) Date of Patent: Sep. 19, 2017

(54) TOUCH SCREEN VIDEO SCROLLING

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 14/336,002

(22) Filed: Jul. 21, 2014

(65) Prior Publication Data
US 2016/0018983 A1 Jan. 21, 2016

(51) Int. Cl.
| | |
|---|---|
| *G06F 3/00* | (2006.01) |
| *G11B 27/10* | (2006.01) |
| *G06F 3/0485* | (2013.01) |
| *G06F 3/0488* | (2013.01) |
| *G11B 27/00* | (2006.01) |
| *G11B 27/34* | (2006.01) |

(52) U.S. Cl.
CPC .......... *G11B 27/102* (2013.01); *G06F 3/0485* (2013.01); *G06F 3/0488* (2013.01); *G11B 27/005* (2013.01); *G11B 27/34* (2013.01)

(58) Field of Classification Search
CPC .. G06F 3/017; G06F 3/04883; G06F 3/04855; G06F 3/0485
USPC .......... 715/716, 720, 771, 784, 863
See application file for complete search history.

(56) References Cited

U.S. PATENT DOCUMENTS

| | | | |
|---|---|---|---|
| 8,358,380 B2 | 1/2013 | Schoenblum et al. | |
| 2009/0172532 A1* | 7/2009 | Chaudhri | G06F 3/0482 715/702 |
| 2011/0025627 A1* | 2/2011 | Sakai | G06F 3/0485 715/784 |

(Continued)

FOREIGN PATENT DOCUMENTS

| | | |
|---|---|---|
| WO | 2013141239 | 8/2013 |
| WO | 2013148002 | 10/2013 |

OTHER PUBLICATIONS

Hartman, Bob; A Page Turn Effect Using C#; Code Project; http://www.codeproject.com/Articles/13202/A-Page-Turn-Effec-Using-C; Feb. 24, 2006; 12 pages.

(Continued)

*Primary Examiner* — Haoshian Shih
(74) *Attorney, Agent, or Firm* — Schmeiser, Olsen & Watts; Michael A. Petrocelli

(57) ABSTRACT

A configuration method is provided. The method includes receiving a command for configuring touch screen functions associated with scrolling through a video file in a forward direction or a reverse direction at various speeds dependent on a direction and distance of movement of a touch screen gesture performed by a user. A movement distance of the touch screen gesture in a forward direction is associated with a first specified number of video frames of the video file and a forward scrolling speed is determined. An additional movement distance of the touch screen gesture in a reverse direction is associated with a second specified number of video frames of the video file and a reverse scrolling speed is determined. In response, a scrolling process is enabled.

16 Claims, 6 Drawing Sheets

(56) References Cited

U.S. PATENT DOCUMENTS

| | | | |
|---|---|---|---|
| 2011/0191679 A1* | 8/2011 | Lin .................. | G06F 17/30781 |
| | | | 715/716 |
| 2013/0107948 A1 | 5/2013 | Deforest et al. | |
| 2013/0145268 A1 | 6/2013 | Kukulski | |
| 2015/0067513 A1* | 3/2015 | Zambetti .............. | G06F 3/0482 |
| | | | 715/716 |
| 2015/0309686 A1* | 10/2015 | Morin .................. | G06F 3/0485 |
| | | | 715/720 |

OTHER PUBLICATIONS

Bhangal, Sham; The Page Turn Effect in Flash MX; Sep. 3, 2004; http:/oreilly.com/javascript/archive/flashhacks.html; 4 pages.

Anonymous; A method of switching on camera applicatin quickly and automatically; IP.com; IPCOM000231019D; Sep. 22, 2013; 22 pages.

Anonymous; Methods, Systems and Media for Improved Navigation in Audio and/or Video Players; IP.com; IPCOM000229275D; Jul. 17, 2013;16 pages.

* cited by examiner

TOUCH SCREEN VIDEO SCROLLING

FIELD

The present invention relates generally to a method for video scrolling, and in particular to a method and associated system for speed dependent scrolling process associated with a touch screen device.

BACKGROUND

Presenting a video file typically includes an inaccurate process with little flexibility. Configuring devices for viewing a video file may include a complicated process that may be time consuming and require a large amount of resources. Accordingly, there exists a need in the art to overcome at least some of the deficiencies and limitations described herein above.

SUMMARY

A first aspect of the invention provides a configuration method comprising: receiving from a user, by a computer processor of touch screen computing device, a command for configuring touch screen functions associated with scrolling through a video file in a forward direction or a reverse direction at various speeds dependent on a direction and distance of movement of a touch screen gesture performed by the user; associating, by the computer processor, a first specified movement distance of the touch screen gesture in a forward direction with a first specified number of video frames of the video file; determining, by the computer processor based on results of the associating the first specified movement distance, a forward speed for scrolling through video frames of the video file in the forward direction; associating, by the computer processor, a second specified movement distance of the touch screen gesture in a reverse direction with a second specified number of video frames of the video file; determining, by the computer processor based on results of the associating the second specified movement distance, a reverse speed for scrolling through the video frames of the video file in the reverse direction; presenting to the user, by the computer processor, the video file; and enabling, by the computer processor, a scrolling process allowing the user to scroll through the video frames of the video file in the forward direction at the forward speed and in the reverse direction at the reverse speed using the touch screen gesture.

A second aspect of the invention provides a touchscreen computing device comprising a computer processor coupled to a computer-readable memory unit, the memory unit comprising instructions that when executed by the computer processor implements a method comprising: receiving from a user, by the computer processor, a command for configuring touch screen functions associated with scrolling through a video file in a forward direction or a reverse direction at various speeds dependent on a direction and distance of movement of a touch screen gesture performed by the user; associating, by the computer processor, a first specified movement distance of the touch screen gesture in a forward direction with a first specified number of video frames of the video file; determining, by the computer processor based on results of the associating the first specified movement distance, a forward speed for scrolling through video frames of the video file in the forward direction; associating, by the computer processor, a second specified movement distance of the touch screen gesture in a reverse direction with a second specified number of video frames of the video file; determining, by the computer processor based on results of the associating the second specified movement distance, a reverse speed for scrolling through the video frames of the video file in the reverse direction; presenting to the user, by the computer processor, the video file; and enabling, by the computer processor, a scrolling process allowing the user to scroll through the video frames of the video file in the forward direction at the forward speed and in the reverse direction at the reverse speed using the touch screen gesture.

A third aspect of the invention provides a computer program product for configuring a connection, the computer program product comprising: one or more computer-readable, tangible storage devices; program instructions, stored on at least one of the one or more storage devices, to receive from a user, a command for configuring touch screen functions associated with scrolling through a video file in a forward direction or a reverse direction at various speeds dependent on a direction and distance of movement of a touch screen gesture performed by the user; program instructions, stored on at least one of the one or more storage devices, to associate a first specified movement distance of the touch screen gesture in a forward direction with a first specified number of video frames of the video file; program instructions, stored on at least one of the one or more storage devices, to determine, a forward speed for scrolling through video frames of the video file in the forward direction; program instructions, stored on at least one of the one or more storage devices, to associate a second specified movement distance of the touch screen gesture in a reverse direction with a second specified number of video frames of the video file; program instructions, stored on at least one of the one or more storage devices, to determine a reverse speed for scrolling through the video frames of the video file in the reverse direction; program instructions, stored on at least one of the one or more storage devices, to present the video file to the user; and program instructions, stored on at least one of the one or more storage devices, to enable a scrolling process allowing the user to scroll through the video file in the forward direction at the forward speed and in the reverse direction at the reverse speed using the touch screen gesture.

The present invention advantageously provides a simple method and associated system capable of presenting a video file.

DETAILED DESCRIPTION

Figure 1:
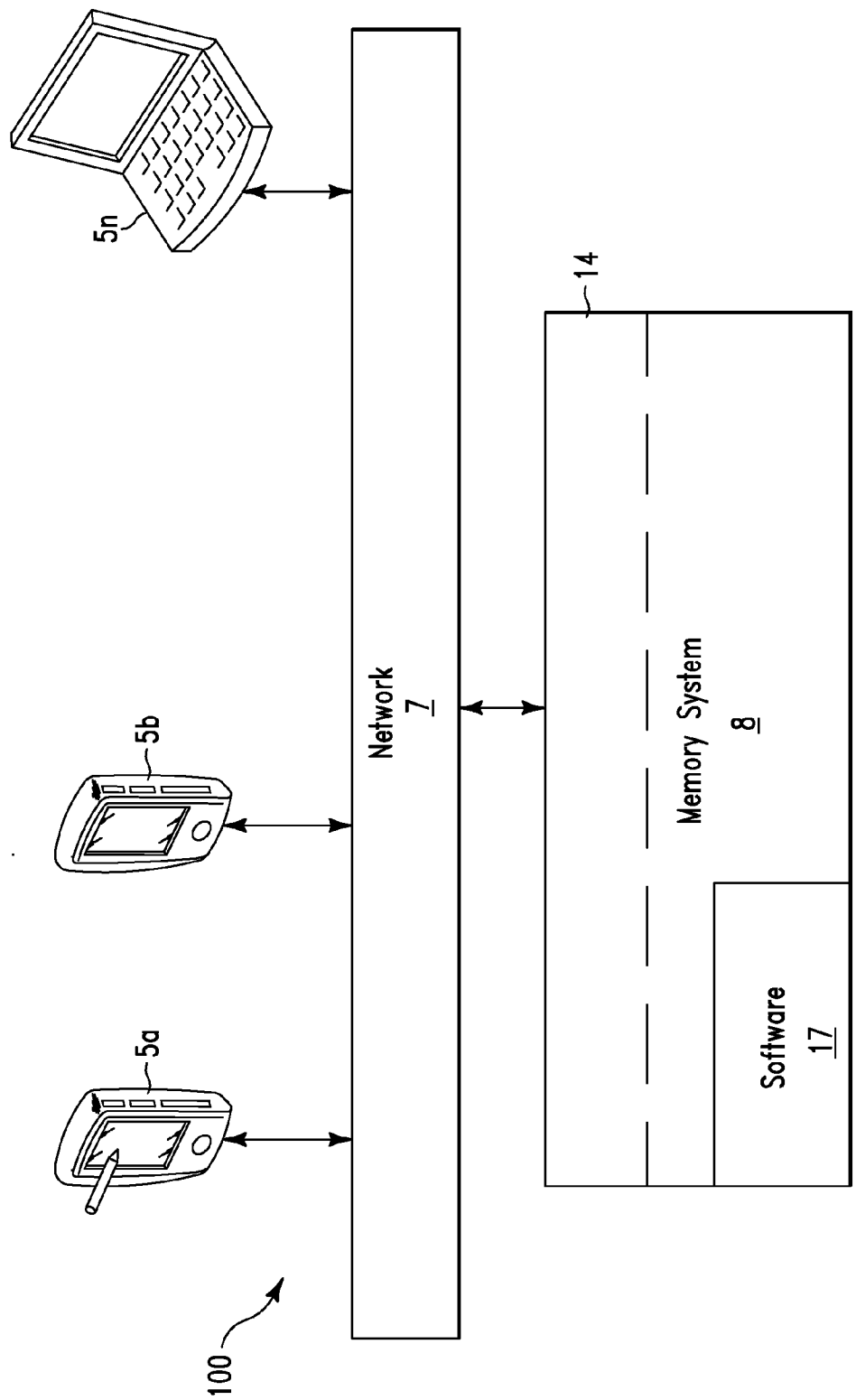
FIG. 1 illustrates a system for navigating through frames of a video file based on distance moved by a user's finger gesture on touch screen devices, in accordance with embodiments of the present invention.

FIG. 1 illustrates a system 100 for navigating through frames of a video file based on distance moved by a user's finger gesture on touch screen (enabled) devices 5a . . . 5n, in accordance with embodiments of the present invention. The above and other features of the present invention will become more distinct by a detailed description of embodiments shown in combination with attached drawings. Identical reference numbers represent the same or similar parts in the attached drawings of the invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

System 100 enables a user to configure finger (or any portion of a user's hand) gesture attributes on any of touch screen devices 5a . . . 5n such that a unit of distance traveled by the user's finger correlates to specified video scrolling speed. For example, a user is enabled to (without the use of a scroll bar) activate any of touch screen devices 5a . . . 5n to swipe (on any touch screen portion of touch screen devices 5a . . . 5n) in a forward and/or reverse direction to enable a video scrolling process. A video scrolling speed is configurable such that a user may step through a video file (or streaming video) on a frame by frame basis (in forward and reverse directions) or the user may be able to scroll through the video file (in forward and reverse directions) at very high speeds. Additionally, a forward scrolling speed may be configured at a different scrolling speed from a reverse scrolling speed.

Additionally, mathematical methods may be used to determine forward and reverse scroll speeds. For example, as a user swipes their finger (i.e., enables a touch screen gesture) on a touch screen, a number of frames per cm is calculated and in response a video (e.g., a movie) responds by moving 120 frames based on a 5 cm move. A software application (e.g., software 17 and/or software located on any of touch screen devices 5a . . . 5n) may track a starting point, direction, and distance of the touch screen gesture. A graphical user interface (GUI) may be provided (i.e., as described with respect to FIGS. 3 and 5, infra) to configure and control framing speeds. The GUI may comprise a hidden GUI on the touch screen (e.g., the GUI may be hidden in an upper corner of the touch screen display). The GUI (e.g., when enabled) allows a configurable number of frames per cm (forward and backward directions independently) to be modified. Additionally, simultaneous thumbnail images may be presented on the touch screen during the scrolling process as described with respect to FIG. 3, infra.

System 100 of FIG. 1 includes touch screen devices 5a . . . 5n connected through a network 7 to a computing system 14. Alternatively, touch screen devices 5a . . . 5n may comprise independent functionality for performing and modifying the scrolling process. Network 7 may include any type of network including, inter alia, a local area network, (LAN), a wide area network (WAN), the Internet, a wireless network, etc. Devices 5a . . . 5n may include any type of touch screen computing devices including, inter alia, a computer (PC), a laptop computer, a tablet computer, a server, a PDA, a smart phone, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17.

System 100 enables a video file to be considered as multipage document such that each frame of video file is considered as a single page of the video file. Therefore, user (i.e., via a touch screen gesture) may scroll through video frames in a forward and reverse direction thereby allowing the user to view a series of video frames during the scrolling process. Based on a distance traveled (along the touch screen) with respect to the touch screen gesture, different lengths of video portions will be scrolled in a forward or reverse direction. The user may configure a unit travel distance (of the touch screen gesture) with respect to a video scroll length.

Figure 2:
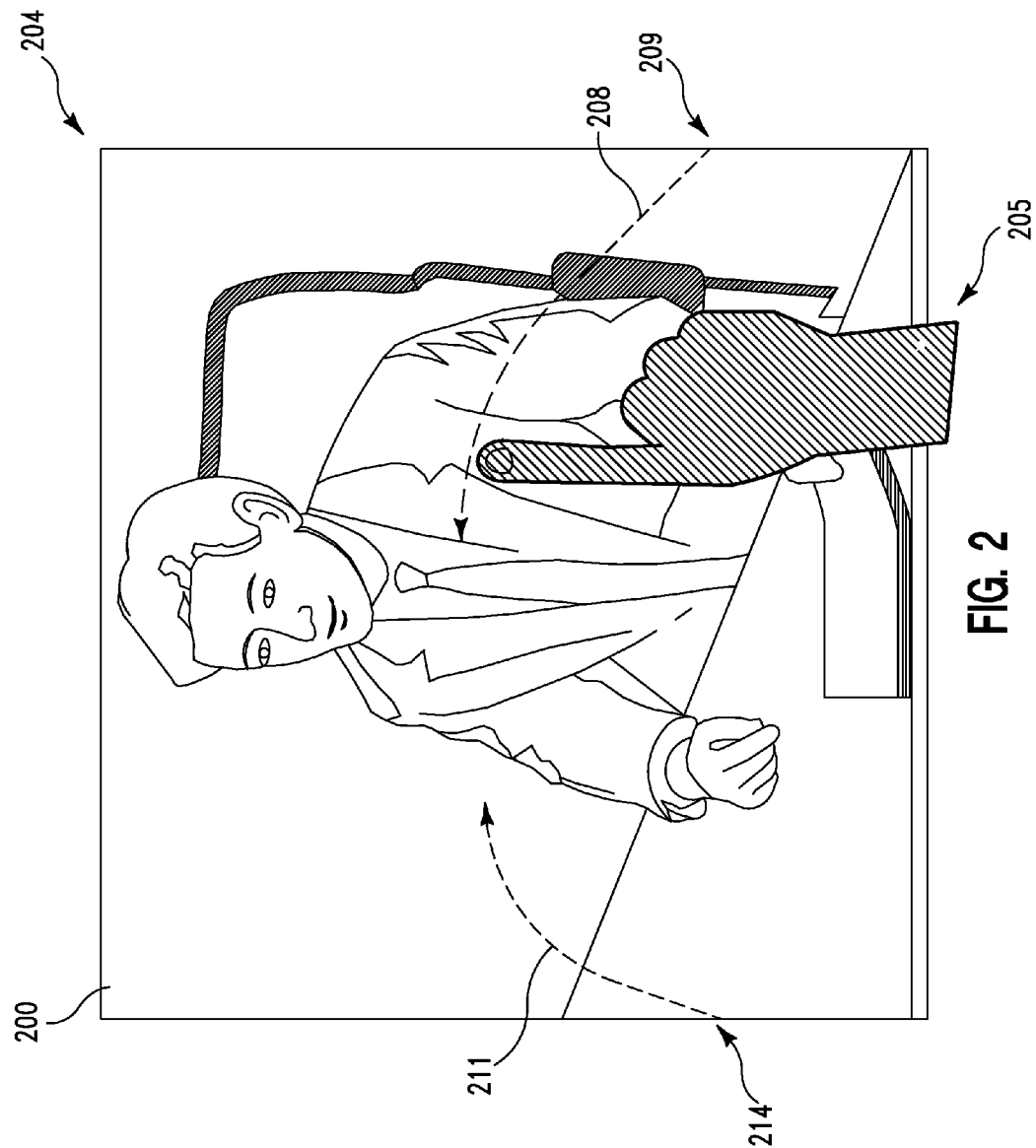
FIG. 2 illustrates a touch screen of a touch screen device for navigating through frames of a video file based on distance moved by a user's finger gesture on the touch screen, in accordance with embodiments of the present invention.

FIG. 2 illustrates a touch screen 200 of a touch screen device 204 for navigating through frames of a video file 204 based on distance moved by a user's finger gesture 205 on the touch screen 200, in accordance with embodiments of the present invention. Touch screen 200 allows a user to scroll through video file 204 using finger gesture 205. The user performs a process comprising a simulation associated with turning pages of video file 204. The user may configure a unit length of finger travel with a time of video length scrolling. The user may scroll through the video file 204 in a forward direction 208 (in an arcing motion as illustrated or any type of straight line motion) initiating from a corner 209. Alternatively, the user may scroll through the video file 204 in a reverse direction 211 (in an arcing motion as illustrated in FIG. 2 or any type of straight line motion) initiating from a corner 214.

Figure 3:
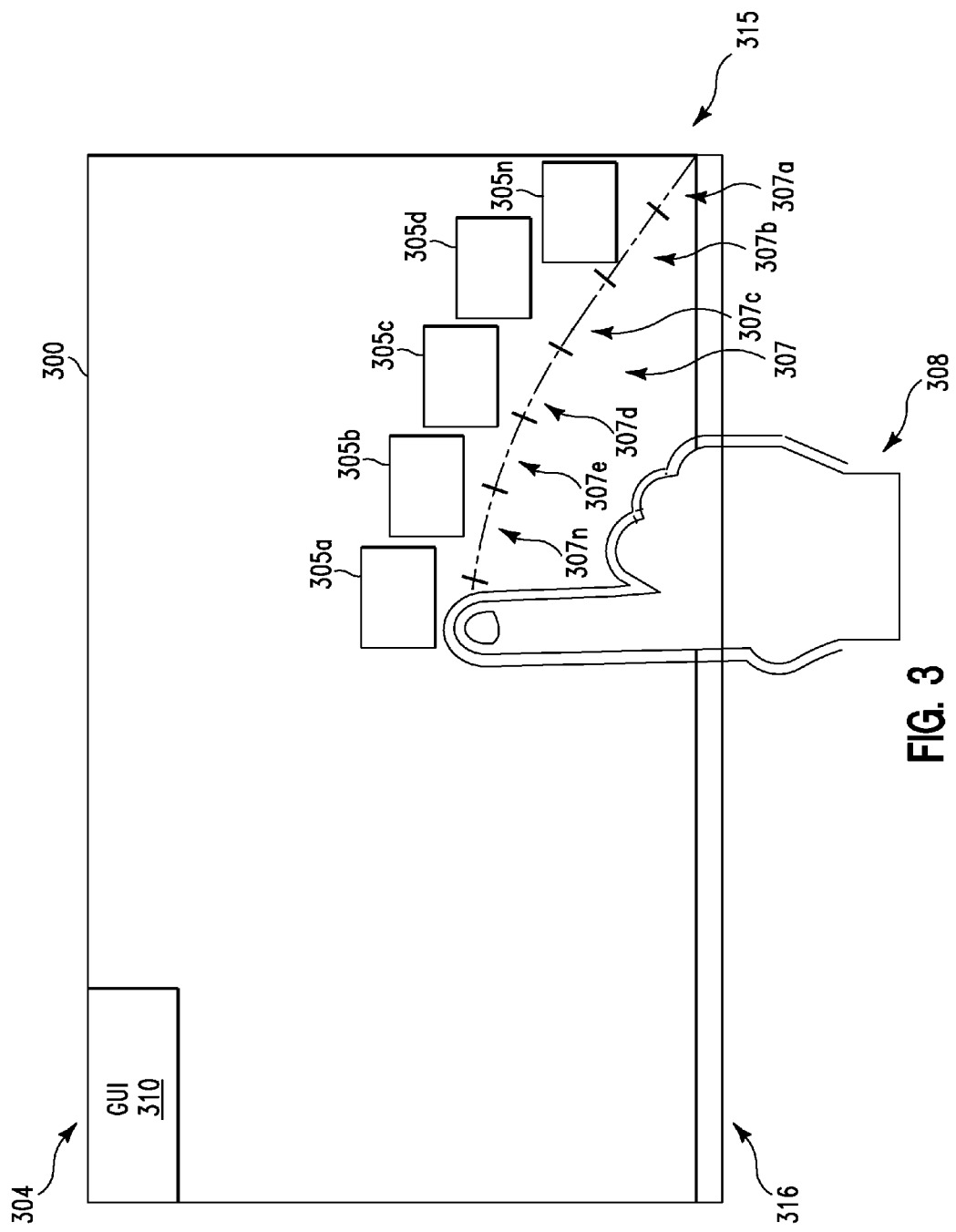
FIG. 3 illustrates an alternative touch screen 300 of a touch screen device, in accordance with embodiments of the present invention.

FIG. 3 illustrates a touch screen 300 of a touch screen device 304 for navigating through thumbnail images 305a . . . 305n representing frames of a video file, in accordance with embodiments of the present invention. Based on a travel distance 307 (comprising travel unit measurements 307a . . . 307n) traveled by a user's finger gesture 308 on the touch screen 300, video content will be scrolled. Travel unit measurements 307a . . . 307n may be configured for modification in accordance with video content scrolling. For example, while performing a finger gesture 308, a finger has travelled a 6 unit distance (i.e., travel unit measurements 307a . . . 307n). If the has configured a 5 second interval for a unit distance then the user has scrolled (6*5) seconds=30 seconds. Therefore, the user has scrolled or turned minimum 30×24 frames. Thumbnails images 305a . . . 305n of the current travel distance are displayed to the user. In this example, the user is at a 7th unit length and therefore so thumbnail images 305a . . . 305n are displayed for a 7th unit length. Touch screen 300 of a touch screen device 304 additionally comprises a GUI 310 comprising an interface for configuring, modifying, and control framing speeds. The GUI may comprise a hidden GUI on touch screen 300 (e.g., the GUI may be hidden in an upper corner of the touch screen display). The GUI (e.g., when enabled) allows a configurable number of frames per cm (forward and backward directions independently) to be modified. Therefore, a user may configure a unit travel distance of finger gesture 308 with a specified video length. For example, a 1 cm unit distance may be associated with a 5 second video length or 1 cm video length may be associated with a 1 minute video length. Once a user executes a finger gesture 308 to scroll through video frames, a software application (i.e., within touch screen device 304 or stored remotely) will track a start point of finger gesture 308 and direction of movement. Initiating finger gesture 308 from side 316 enables a fast forward motion. Likewise, initiating finger gesture 308 from side 315 enables a reverse motion. At any point in time, the software application may track a current position of a video progress bar representing a position of a video file. In response, the software application will calculate a distance travelled by finger gesture 308, and accordingly the software application will calculate a video length to be scrolled. thumbnail images 305a . . . 305n representing frames of the video file and representing a current unit travel distance are displayed. The software application will select top ranked frames or randomly selected video frames.

Figure 4:
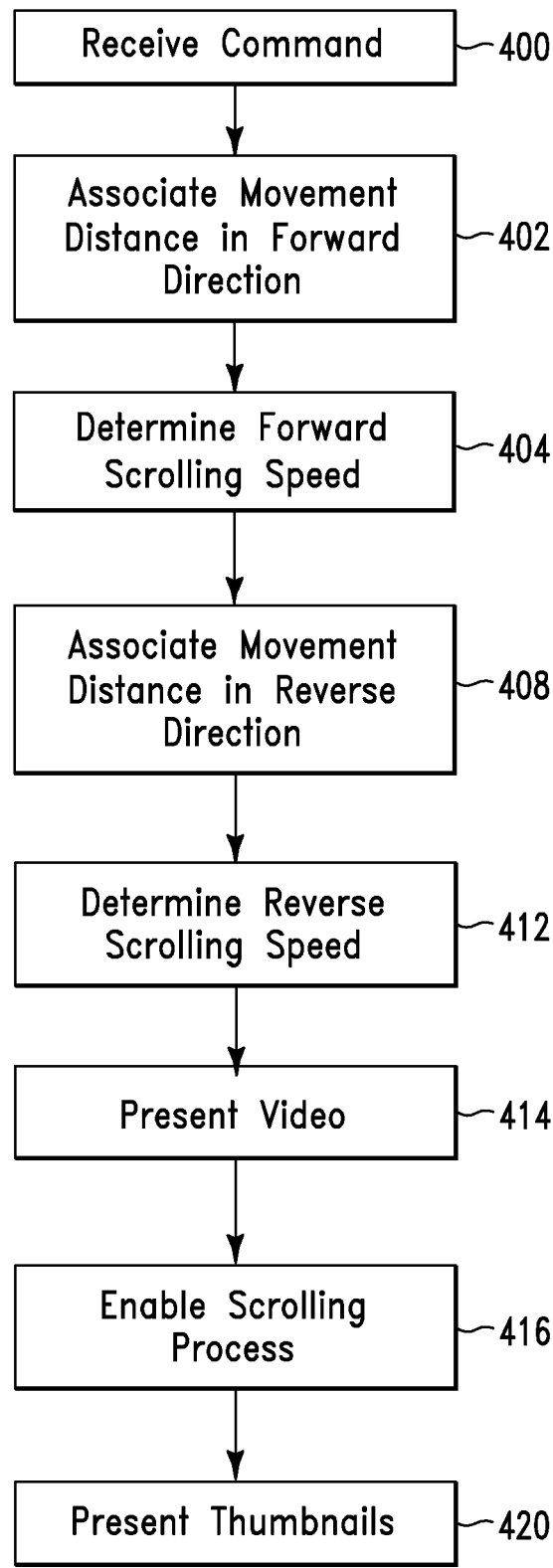
FIG. 4 illustrates an algorithm detailing a process flow enabled by the system 100 of FIG. 1 for navigating through frames of a video file based on distance moved by a user's finger gesture on touch screen devices, in accordance with embodiments of the present invention.

FIG. 4 illustrates an algorithm detailing a process flow enabled by system 100 of FIG. 1 for navigating through frames of a video file based on distance moved by a user's finger gesture on touch screen devices, in accordance with embodiments of the present invention. Each of the steps in the algorithm of FIG. 4 may be enabled and executed in any order by a computer processor executing computer code. In step 400, a GUI program receives a command from a user. The command is for configuring touch screen functions associated with scrolling through a video file (or stream) in a forward direction or a reverse direction at various speeds dependent on a direction and distance of movement of a touch screen gesture performed by the user. The touch screen gesture may include, inter alia, moving at least one finger, in a planer motion and/or an arcing motion, across a touch screen of the touch screen device. In step 402, program code associates a specified movement distance of the touch screen gesture in a forward direction with a specified number of video frames of the video file. In step 404 (based on results of the association of step 402), program code calculates a forward speed for scrolling through the video file in the forward direction. In step 408, program code associates a specified movement distance of the touch screen gesture in a reverse direction with a specified number of video frames of the video file. In step 412 (based on results of the association of step 408), program code calculates a reverse speed for scrolling through the video file in the reverse direction. The forward speed may comprise a same speed or a differing speed as the reverse speed. In step 414, the GUI program presents the video file to the user. In step 416, program code enables a scrolling process. The scrolling process allows the user to scroll through the video file in the forward direction at the forward speed and in the reverse direction at the reverse speed using the touch screen gesture. In optional step 420, program code simultaneously presents thumbnail images indicating a current travel distance associated with video content scrolling of the video file during the scrolling process to the user. The thumbnail images are associated with each frame (of the video file) that may be optionally displayed while the user is scrolling via use of the touch screen gesture. The touch screen gesture is used to quickly scroll the video file to a portion of the video file that is close to a point of interest and as the video file is scrolled close to the point of interest, the thumbnail images (i.e., of video frames) enables a user to visually view the video file frame by frame.

Figure 5:
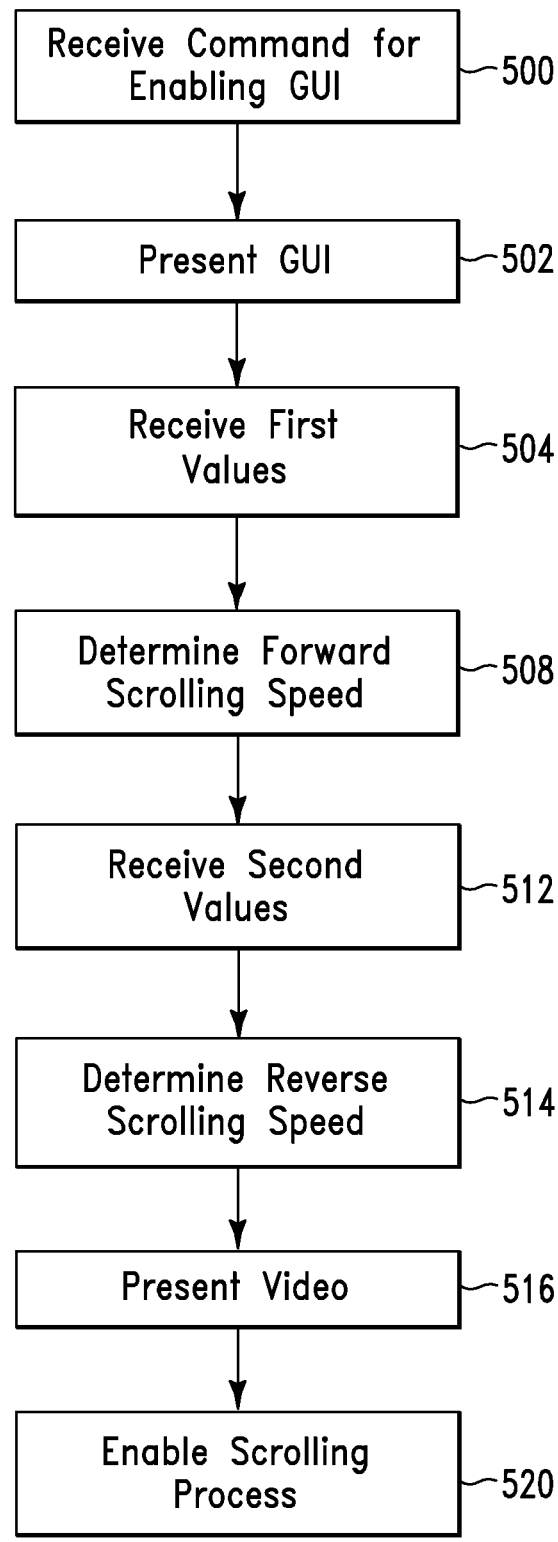
FIG. 5 illustrates an algorithm detailing a process flow enabled by the system 100 of FIG. 1 for using a GUI for modifying navigation through frames of a video file based on distance moved by a user's finger gesture on touch screen devices, in accordance with embodiments of the present invention.

FIG. 5 illustrates an algorithm detailing a process flow enabled by system 100 of FIG. 1 for using a GUI for modifying navigation through frames of a video file based on distance moved by a user's finger gesture on touch screen devices, in accordance with embodiments of the present invention. Each of the steps in the algorithm of FIG. 4 may be enabled and executed in any order by a computer processor executing computer code. In step 500, a GUI program receives a command for enabling a (hidden from view) GUI from a user. The enabled GUI is for receiving a modification command for re-configuring touch screen functions associated with scrolling through a video file (or stream) in a forward direction or a reverse direction at various speeds dependent on a direction and distance of movement of a touch screen gesture performed by the user. In step 502, the GUI program presents the GUI to the user. In step 504, program code receives first values (via the GUI) from the user. The first values indicate a first modified movement distance of the touch screen gesture in a forward direction and a modified number of associated video frames. The first values comprise an input for associating a gesture distance with a number of video frames to move in a forward or backward direction. The GUI enables input of differing values. For example (depending on the input value), a touch screen gesture moved one inch on a touch screen may enable movement of a video file forward by one minute, one hour, etc. Therefore, the first values enable a process for controlling a granularity a forward and reverse (video file movement) speed. In step 508, program code determines a modified forward speed based on the first values. The modified forward speed is for scrolling through the video file in the forward direction. In step 512, program code receives second values (via the GUI) from the user. The second values indicate a second modified movement distance of the touch screen gesture in the reverse direction and a second modified number of associated video frames. In step 514, program code determines a modified reverse speed based on the second values. The modified reverse speed is for scrolling through the video file in the reverse direction. In step 518, program code presents the video file to the user. In step 520, program code enables a scrolling process for the user. The scrolling process allows the user to scroll through the video file in the forward direction at the modified forward speed and in the reverse direction at the modified reverse speed using the touch screen gesture. As described with respect to step 504, the first values have been changed in order to change a speed for associating a gesture distance with a number of video frames to move in a forward or backward direction.

Figure 6:
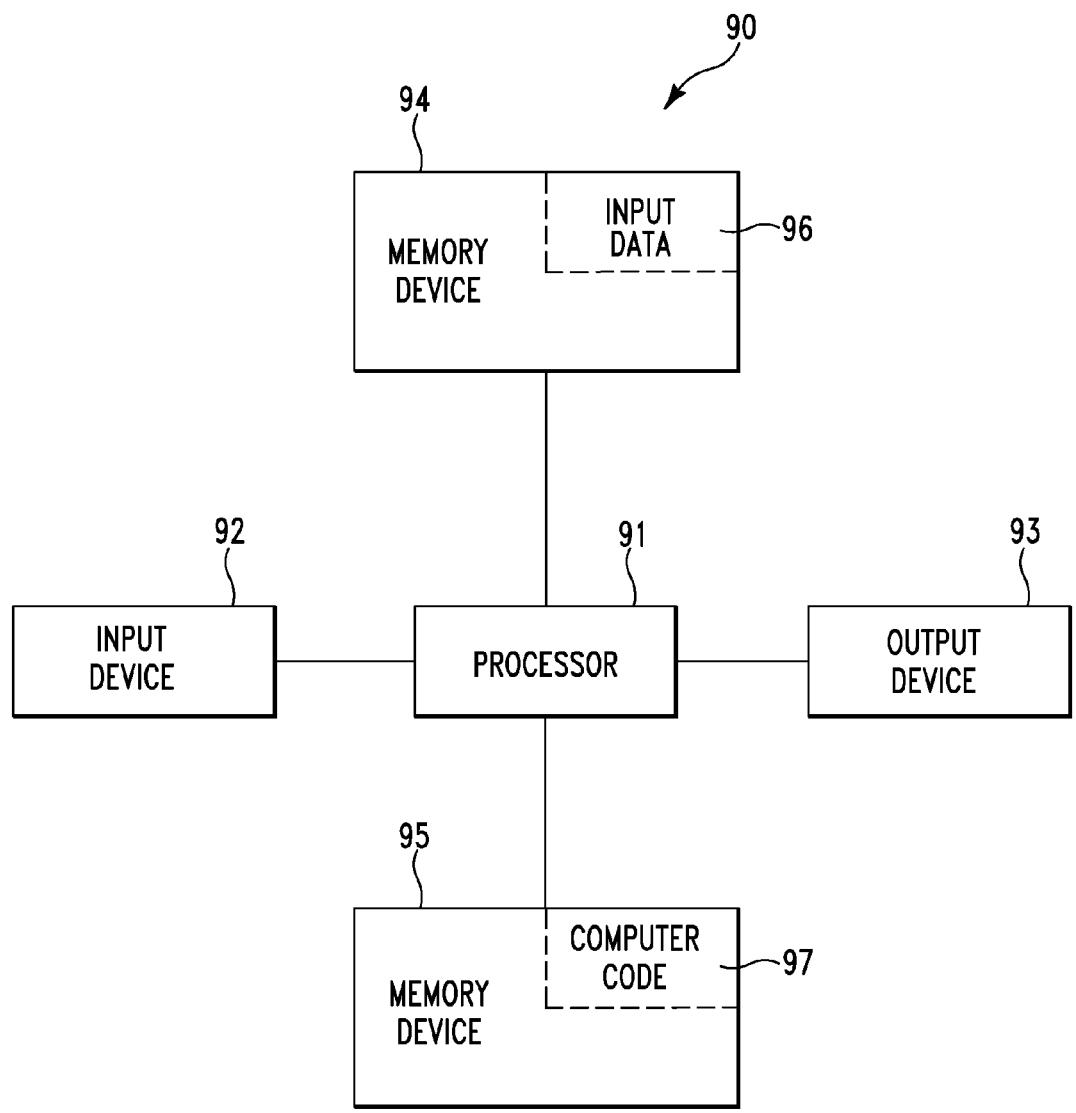
FIG. 6 illustrates a computer apparatus used by the system of FIG. 1 for navigating through frames of a video file based on distance moved by a user's finger gesture on touch screen devices, in accordance with embodiments of the present invention.

FIG. 6 illustrates a computer apparatus 90 (e.g., any of the devices of FIG. 1) for navigating through frames of a video file based on distance moved by a user's finger gesture on touch screen devices, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 4 and 5) for navigating through frames of a video file based on distance moved by a user's finger gesture on touch screen devices. The processor 91 executes the computer code 97. The memory device 94 includes input data 96.

The input data 96 includes input required by the computer code 97. The output device 93 displays output from the computer code 97. Either or both memory devices 94 and 95 (or one or more additional memory devices not shown in FIG. 6) may include the algorithm of FIGS. 4 and 5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to navigate through frames of a video file based on distance moved by a user's finger gesture on touch screen devices. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for navigating through frames of a video file based on distance moved by a user's finger gesture on touch screen devices. In another embodiment, the invention provides a business method that performs the process steps of the invention on a subscription, advertising, and/or fee basis. That is, a service supplier, such as a Solution Integrator, could offer to for navigate through frames of a video file based on distance moved by a user's finger gesture on touch screen devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A configuration method comprising:

receiving from a user, by a computer processor of a touch screen computing device, a command for configuring touch screen functions associated with scrolling through a video file in a forward direction or a reverse direction at various speeds dependent on a direction and distance of movement of a touch screen gesture performed by said user, wherein said touch screen gesture comprises moving at least one finger, in an arcing motion initiating from a corner of a touch screen of said touch screen computing device, across said touch screen;

associating, by said computer processor, a first specified movement distance of said touch screen gesture in a forward direction with a first specified number of video frames of said video file, wherein said first specified movement distance comprises a specified number of travel unit measurements, and wherein each travel unit measurement of said specified number of travel unit measurements is associated with a specified time interval;

determining, by said computer processor based on results of said associating said first specified movement distance, a forward speed for scrolling through video frames of said video file in said forward direction;

associating, by said computer processor, a second specified movement distance of said touch screen gesture in a reverse direction with a second specified number of video frames of said video file;

determining, by said computer processor based on results of said associating said second specified movement distance, a reverse speed for scrolling through said video frames of said video file in said reverse direction;

presenting to said user, by said computer processor, said video file;

enabling, by said computer processor, a scrolling process allowing said user to scroll through said video frames of said video file in said forward direction at said forward speed and in said reverse direction at said reverse speed using said touch screen gesture;

tracking, by said processor, motion of a touch screen finger gesture executed by said user, wherein said motion enables an additional arcing motion initiating from a starting point at said corner of said touch screen and terminating at an endpoint of an arc generated following said additional arcing motion; and simultaneously presenting to said user in response to said tracking, by said computer processor, thumbnail images of each associated video frame of said video file during said scrolling process of said video file, wherein said thumbnail images are presented to said user along said arc following said additional arcing motion such that each associated thumbnail image, of said thumbnail images, is presented on said touch screen with respect to an associated travel unit measurement of said specified number of travel unit measurements, wherein said thumbnail images being presented in combination form an additional arc following said arc such that each successive thumbnail image of said thumbnail images is located at a higher position than each previously presented thumbnail image on said touch screen with respect to a bottom portion of said touchscreen, and wherein each successive thumbnail image is fully viewable.

2. The method of claim 1, wherein said forward speed comprises a same speed as said reverse speed.

3. The method of claim 1, wherein said forward speed differs from said reverse speed.

4. The method of claim 1, wherein said touch screen gesture comprises moving at least one finger, in a planer motion, across said touch screen of said touch screen computing device.

5. The method of claim 1, further comprising:

presenting to said user, by said computer processor, a graphical user interface (GUI) for receiving a modification command for re-configuring said touch screen functions;

receiving from said user, by said computer processor via said GUI, first values indicating a first modified movement distance of said touch screen gesture in said forward direction and a first modified number of associated video frames;

determining, by said computer processor based on said first values, a modified forward speed for scrolling through said video frames of said video file in said forward direction;

receiving from said user, by said computer processor via said GUI, second values indicating a second modified movement distance of said touch screen gesture in said reverse direction and a second modified number of associated video frames;

determining, by said computer processor based on said second values, a modified reverse speed for scrolling through said video frames of said video file in said reverse direction;

presenting to said user, by said computer processor, said video file; and enabling, by said computer processor, a scrolling process allowing said user to scroll through said video file in said forward direction at said modified forward speed and in said reverse direction at said modified reverse speed using said touch screen gesture.

6. The method of claim 5, wherein said GUI comprises a hidden GUI on a touch screen of said touch screen computing device, and wherein said method further comprises:

receiving a touch screen command for enabling said hidden GUI for performing said presenting said GUI to said user.

7. The method of claim 1, further comprising:

providing at least one support service for at least one of creating, integrating, hosting, maintaining, and deploying computer-readable code in the computing system, said code being executed by the computer processor to implement said receiving, said first associating, said determining said forward speed, said second associating, said determining said reverse speed, said presenting, and said enabling.

8. A touchscreen computing device comprising a computer processor coupled to a computer-readable memory unit, said memory unit comprising instructions that when executed by the computer processor implements a method comprising:

receiving from a user, by said computer processor, a command for configuring touch screen functions associated with scrolling through a video file in a forward direction or a reverse direction at various speeds dependent on a direction and distance of movement of a touch screen gesture performed by said user, wherein said touch screen gesture comprises moving at least one finger, in an arcing motion initiating from a corner of a touch screen of said touch screen computing device, across said touch screen;

associating, by said computer processor, a first specified movement distance of said touch screen gesture in a forward direction with a first specified number of video frames of said video file, wherein said first specified movement distance comprises a specified number of travel unit measurements, and wherein each travel unit measurement of said specified number of travel unit measurements is associated with a specified time interval;

determining, by said computer processor based on results of said associating said first specified movement distance, a forward speed for scrolling through video frames of said video file in said forward direction;

associating, by said computer processor, a second specified movement distance of said touch screen gesture in a reverse direction with a second specified number of video frames of said video file;

determining, by said computer processor based on results of said associating said second specified movement distance, a reverse speed for scrolling through said video frames of said video file in said reverse direction;

presenting to said user, by said computer processor, said video file;

enabling, by said computer processor, a scrolling process allowing said user to scroll through said video frames of said video file in said forward direction at said forward speed and in said reverse direction at said reverse speed using said touch screen gesture; tracking, by said processor, motion of a touch screen finger gesture executed by said user, wherein said motion enables an additional arcing motion initiating from a starting point at said corner of said touch screen and terminating at an endpoint of an arc generated following said additional arcing motion; and simultaneously presenting to said user in response to said tracking, by said computer processor, thumbnail images of each associated video frame of said video file during said scrolling process of said video file, wherein said thumbnail images are presented to said user along said arc following said additional arcing motion such that each associated thumbnail image, of said thumbnail images, is presented on said touch screen with respect to an associated travel unit measurement of said specified number of travel unit measurements, wherein said thumbnail images being presented in combination form an additional arc following said arc such that each successive thumbnail image of said thumbnail images is located at a higher position than each previously presented thumbnail image on said touch screen with respect to a bottom portion of said touchscreen, and wherein each successive thumbnail image is fully viewable.

9. The computing device of claim 8, wherein said forward speed comprises a same speed as said reverse speed.

10. The computing device of claim 8, wherein said forward speed differs from said reverse speed.

11. The computing device of claim 8, wherein said touch screen gesture comprises moving at least one finger, in a planer motion, across said touch screen of said touch screen computing device.

12. The computing device of claim 8, wherein said method further comprises:

presenting to said user, by said computer processor, a graphical user interface (GUI) for receiving a modification command for re-configuring said touch screen functions;

receiving from said user, by said computer processor via said GUI, first values indicating a first modified movement distance of said touch screen gesture in said forward direction and a first modified number of associated video frames;

determining, by said computer processor based on said first values, a modified forward speed for scrolling through said video frames of said video file in said forward direction;

receiving from said user, by said computer processor via said GUI, second values indicating a second modified movement distance of said touch screen gesture in said reverse direction and a second modified number of associated video frames;

determining, by said computer processor based on said second values, a modified reverse speed for scrolling through said video frames of said video file in said reverse direction;

presenting to said user, by said computer processor, said video file; and enabling, by said computer processor, a scrolling process allowing said user to scroll through said video file in said forward direction at said modified forward speed and in said reverse direction at said modified reverse speed using said touch screen gesture.

13. The computing device of claim 8, wherein said GUI comprises a hidden GUI on a touch screen of said touch screen computing device, and wherein said method further comprises:

receiving a touch screen command for enabling said hidden GUI for performing said presenting said GUI to said user.

14. A computer program product for configuring a video scrolling process, the computer program product comprising:

one or more computer-readable, tangible storage devices;

program instructions, stored on at least one of the one or more storage devices, to receive from a user, a command for configuring touch screen functions associated with scrolling through a video file in a forward direction or a reverse direction at various speeds dependent on a direction and distance of movement of a touch screen gesture performed by said user, wherein said touch screen gesture comprises moving at least one finger, in an arcing motion initiating from a corner of a touch screen of said touch screen computing device, across said touch screen;

program instructions, stored on at least one of the one or more storage devices, to associate a first specified movement distance of said touch screen gesture in a forward direction with a first specified number of video frames of said video file, wherein said first specified movement distance comprises a specified number of travel unit measurements, and wherein each travel unit measurement of said specified number of travel unit measurements is associated with a specified time interval;

program instructions, stored on at least one of the one or more storage devices, to determine, a forward speed for scrolling through video frames of said video file in said forward direction;

program instructions, stored on at least one of the one or more storage devices, to associate a second specified movement distance of said touch screen gesture in a reverse direction with a second specified number of video frames of said video file;

program instructions, stored on at least one of the one or more storage devices, to determine a reverse speed for scrolling through said video frames of said video file in said reverse direction;

program instructions, stored on at least one of the one or more storage devices, to present said video file to said user;

program instructions, stored on at least one of the one or more storage devices, to enable a scrolling process allowing said user to scroll through said video file in said forward direction at said forward speed and in said reverse direction at said reverse speed using said touch screen gesture;

program instructions, stored on at least one of the one or more storage devices, to track motion of a touch screen finger gesture executed by said user, wherein said motion enables an additional arcing motion initiating from a starting point at said corner of said touch screen and terminating at an endpoint of an arc generated following said additional arcing motion; and program instructions, stored on at least one of the one or more storage devices, to simultaneously present to said user in response to tracking said motion, thumbnail images of each associated video frame of said video file during said scrolling process of said video file, wherein said thumbnail images are presented to said user along said arc following said additional arcing motion such that each associated thumbnail image, of said thumbnail images, is presented on said touch screen with respect to an associated travel unit measurement of said specified number of travel unit measurements, wherein said thumbnail images being presented in combination form an additional arc following said arc such that each successive thumbnail image of said thumbnail images is located at a higher position than each previously presented thumbnail image on said touch screen with respect to a bottom portion of said touchscreen, and wherein each successive thumbnail image is fully viewable.

15. The computer program product of claim 14, wherein said forward speed comprises a same speed as said reverse speed.

16. The computer program product of claim 14, wherein said forward speed differs from said reverse speed.

* * * * *